S. G. Levis.
Pasteboard Mach.
No. 2,789. Reissued Oct. 22, 1867.
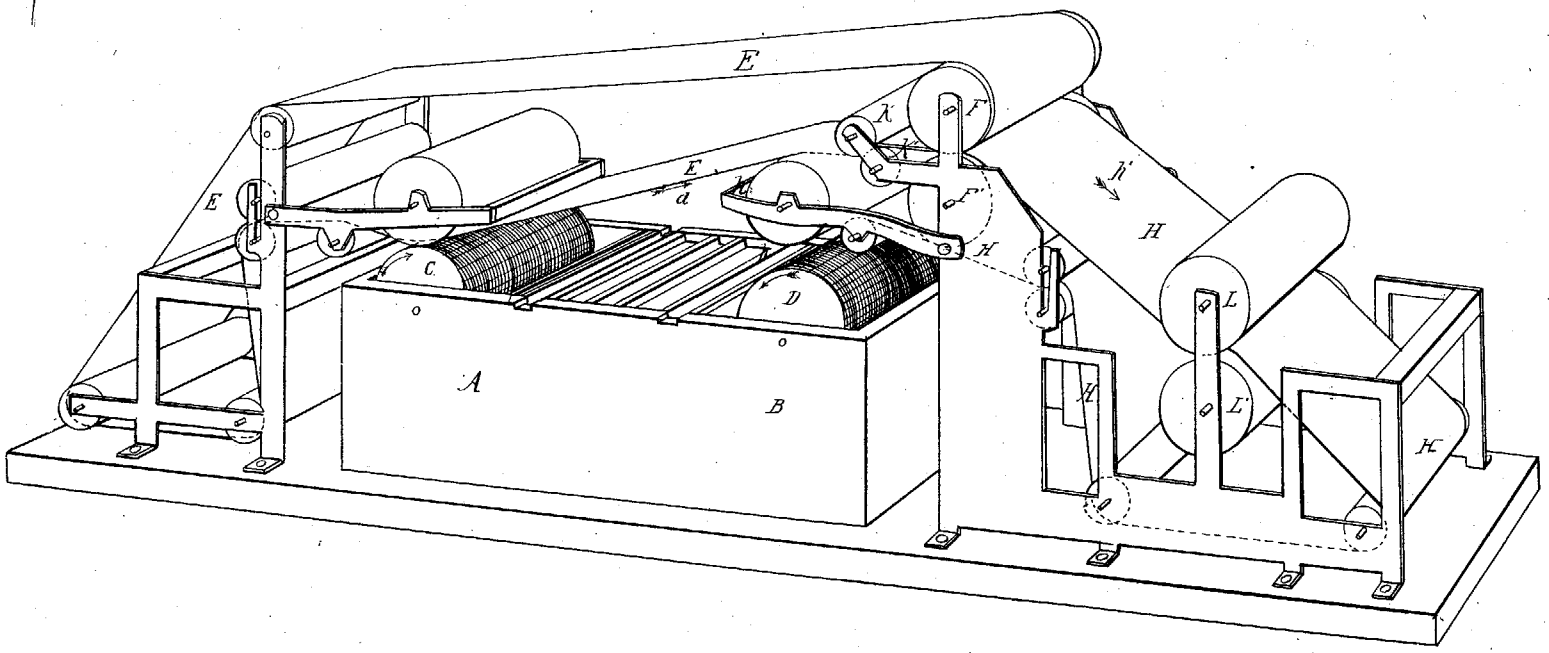
Witnesses.
Geo. E. Buckley
Lewis F. Pratt
Inventor:
S. G. Levis
Atty. pro tem

UNITED STATES PATENT OFFICE.

SAMUEL G. LEVIS, OF KELLYVILLE, PENNSYLVANIA.

IMPROVEMENT IN MAKING THICK PAPER.

Specification forming part of Letters Patent No. 10,519, dated February 14, 1854; Reissue No. 2,789, dated October 22, 1867.

*To all whom it may concern:*

Be it known that I, SAMUEL G. LEVIS, of Kellyville, in the county of Delaware and State of Pennsylvania, have invented a new and useful Improvement in the Construction of Machinery for Making Paper; and I do hereby declare that the following is a full, clear, and exact description of the construction and operation of the same, reference being had to the annexed drawing, which represents a perspective view of my improvement.

In the ordinary manufacture of paper the paper is made in a continuous sheet, of a single uniform thickness, in the following manner: A cylinder of fine wire-cloth rotates, partially immersed, in a vat of prepared pulp. This cylinder rotates in contact above with an endless felt passing around a roller; and onto the felt the paper is formed by the rotating cylinder of wire-cloth pressing the pulp which it has taken up from the vat. The paper thus formed is carried up on the endless felt between two metallic squeeze-rollers, and the water partially squeezed out. The paper then leaves the felt, and is passed between a second pair of squeeze-rollers, and then around a series of calenders or drying-rollers. This is the ordinary method of making paper by cylinder-machines; and the paper so made is of one thickness and uniform texture throughout. The thickness which can be given to paper so made consistently with the preservation of strength and uniformity of strength is limited, for the meshes of the wire-cloth cylinder can only screen a given quantity of water through, and, if the thickness of the layer of pulp be increased beyond a certain extent, the paper would be soft and be crushed between the squeeze-rollers. Thus its texture would be weakened, and the uniformity of its appearance would be destroyed.

It has been long desirable in the art of paper-making to form paper of considerable thickness of perfect texture, and of strength proportioned to such increased thickness. To attain this object several attempts have been made. Thus, the paper, after being formed on the felt and passed through the two pairs of squeeze-rollers, has been wound around a reel before passing over the heated calenders. The undried paper, so reeled, has been passed a second time between the forming-cylinder and the felt, and a second thickness of pulp or paper formed upon the first sheet. It was then passed again through the two successive pairs of squeeze-rollers, as before, and over the drying-rolls or calenders. The first sheet, in this case, being compacted and squeezed partially dry before the second was formed on it, the two sheets were imperfectly combined and were liable to separate. The process was troublesome and tedious also.

Another method attempted was to form two wire-cloth forming-cylinders; and immediately after the pulp or paper had been formed onto the felt by the first of the cylinders a second sheet of pulp or paper was formed upon the first sheet by the second forming-cylinder. This process required a single felt, the ordinary squeeze-rollers, and an additional forming-cylinder, turning in the same vat and in the same direction as the forming-cylinder. It answered very well for thin paper; but, when the thickness of the paper was increased, the expressing the water therefrom in the ordinary manner between the squeeze-rolls would crush the sheet, and thus destroy its uniformity of strength and texture in the same way as described above upon the ordinary cylinder process.

The nature of my improvement consists in forming two or more distinct fabrics, and then pressing them together between two endless felts, instead of between one felt and a press-roll or between two press-rolls, so as to unite them into one compound sheet by a continuous operation, and so that these compound fabrics shall be inseparably united.

By this improvement, also, the thickness of the paper may be increased, and the strength and uniformity of the piece of paper be preserved.

To enable others skilled in the art to make and use my improvement, I proceed to describe the construction, arrangement, and operation of my improvement.

In my improved arrangement I employ two or more separate pulp-vats, A and B, or separate apartments of one vat. (See figure.) In each vat or apartment a forming-cylinder of wire cloth of the ordinary description is placed. These are shown at C and D. Each cylinder is furnished with a separate and distinct endless felt or blanket. The cylinder C forms its pulp or paper onto the felt E. (Shown in red line on the drawing.) The sheet of pulp passes on the lower side of the felt E, in the direction of the arrow *a*, toward the pair of squeeze-rollers F F′. The second forming-cylinder, D, rotates in the pulp-vat B, in the direction indicated by the arrow thereon, and forms a sheet of pulp to the endless felt or blanket H. (Shown in blue line.) This pulp or paper thus formed upon the felt H passes upon that felt toward the squeeze-rollers F F′, as indicated by the arrows *h h*. The two endless felts, with their respective sheets of pulp, pass together over the guide-roller K′ and under the guide-roller K, and then between the squeeze-rollers F F′, thus coming together prior to contact of either felt with the squeeze-rolls, and allowing the water pressed out to pass through the upper felt and run off in front of the rolls at either end of the same. The two sheets of paper, being in contact while the felts pass between the squeeze-rollers, are effectually united together, and a portion of the water is squeezed out.

The fact of the pulp being pressed between two endless felts, so arranged as to allow the water to pass freely through them in front of the rolls, protects it from crushing, and thus preserves the texture. The squeeze-rollers F F′ perform no other function than to press these two sheets together, and the force by which they are kept together is to be adjusted thereto. The compound sheet of paper resulting from the union of the two separated sheets, as above, passes down, as indicated by the arrow *h′*, and through the squeeze-rollers L L′, which perform to it the same function as the first pair of squeeze-rollers in ordinary paper-machines. The paper then passes to the heated calenders in the same manner as in ordinary machines.

It will thus be seen that I make use of a second forming cylinder, an additional pair of squeeze-rolls, and a second endless felt. The advantage of this improved arrangement is, that paper of any desired thickness and of proportionably increased strength composed of two or more layers, may be formed at one operation.

This arrangement of machinery and method of manufacturing can be applied to all descriptions of papers, and is particularly applicable to hardware-paper, card-paper, pasteboards, &c.

This manufacture may be carried on without any interruption or delay, and at a less cost than the methods hereinbefore described. Moreover, as the cylinders C and D rotate in separate and distinct vats, paper may be formed in the same manner which shall be of different colors or different textures on the two sides, or of both different colors and textures on these sides. This will be found of advantage in the manufacture of bonnet-boards, plate-paper, fancy paper, &c.

Having thus described my invention, what I claim as new, and desire to secure by Letters Patent, is—

1. Passing or carrying a sheet of paper-pulp through or between the press-rolls and expressing the water therefrom between two endless felts, so arranged that the water may pass through the felts and run off freely in front of the rolls.

2. Running or operating two or more forming-cylinders in connection with the press-rolls, by means of, or in combination with, two endless felts, so arranged that the water passes through the felts and runs off at the end of the rolls.

3. The combination of the two forming-cylinders C and D, the two endless felts E and H, and the two squeeze-rollers F F′, arranged and operating substantially as described.

SAMUEL G. LEVIS.

Witnesses:
J. E. SHAW,
RICHARD JONES.